(12) United States Patent
Lampl et al.

(10) Patent No.: US 12,522,070 B2
(45) Date of Patent: Jan. 13, 2026

(54) METHOD FOR PROJECTING AT LEAST ONE IMAGE OR VIDEO INSIDE OR OUTSIDE A VEHICLE

(71) Applicant: Bayerische Motoren Werke Aktiengesellschaft, Munich (DE)

(72) Inventors: Christoph Lampl, Munich (DE); Alexander Stuckert, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/804,262

(22) Filed: Aug. 14, 2024

(65) Prior Publication Data
US 2025/0065718 A1 Feb. 27, 2025

(30) Foreign Application Priority Data
Aug. 21, 2023 (DE) ...................... 10 2023 122 311.9

(51) Int. Cl.
*B60K 35/21* (2024.01)
*B60K 35/23* (2024.01)
(Continued)

(52) U.S. Cl.
CPC ........... *B60K 35/21* (2024.01); *H04N 9/3179* (2013.01); *B60K 35/23* (2024.01); *B60K 35/28* (2024.01);
(Continued)

(58) Field of Classification Search
CPC .. B60K 35/21; B60K 2360/334; B60K 35/23; B60K 35/28; H04N 9/3141; H04N 9/312;
(Continued)

(56) References Cited

U.S. PATENT DOCUMENTS 9,061,705 B2 * 6/2015 Kwon ................ B62D 15/0295
11,691,564 B2 * 7/2023 Orlinskiy ............. B60Q 1/0023
362/459

(Continued)

FOREIGN PATENT DOCUMENTS

DE 102011104259 A1 * 8/2012 ........... G06F 9/5094
DE 10 2012 212 178 B4 7/2017
(Continued)

OTHER PUBLICATIONS

German-language Search Report issued in German Application No. 10 2023 122 311.9 dated Oct. 30, 2024 with partial English translation (11 pages).

*Primary Examiner* — Douglas Wilson
(74) *Attorney, Agent, or Firm* — Crowell & Moring LLP

(57) ABSTRACT

A method for projecting at least one image or video inside or outside a vehicle, in particular an automobile, includes the following steps: providing data of the image or video in a data memory; reading-out the data of the image or video by means of a microcontroller of the vehicle and forwarding an image signal to a light projector, which displays the image or video as long as a control unit of the vehicle having a higher computing power than the microcontroller is not started up, wherein the microcontroller is suitable for processing the data of the image or video in order to represent them by way of the light projector; and switching over from the microcontroller as data source for the light projector to the control unit as data source for the light projector after a defined time period as soon as the control unit has been started up.

10 Claims, 1 Drawing Sheet

(51) Int. Cl.
*B60K 35/28* (2024.01)
*B60Q 1/24* (2006.01)
*G05B 19/042* (2006.01)
*H04N 9/31* (2006.01)
*H04N 21/41* (2011.01)
*B60Q 1/32* (2006.01)
*H04N 21/4402* (2011.01)

(52) U.S. Cl.
CPC ........ *B60K 2360/334* (2024.01); *B60Q 1/247* (2022.05); *B60Q 1/323* (2013.01); *B60Q 2400/40* (2013.01); *B60Q 2400/50* (2013.01); *G05B 19/0421* (2013.01); *H04N 9/312* (2013.01); *H04N 9/3141* (2013.01); *H04N 21/4122* (2013.01); *H04N 21/4402* (2013.01)

(58) Field of Classification Search
CPC ............. H04N 9/3179; H04N 21/4122; H04N 21/4402; B60Q 1/247; B60Q 1/323; B60Q 2400/40; B60Q 2400/50; G05B 19/0421
See application file for complete search history.

(56) References Cited

U.S. PATENT DOCUMENTS

| | | |
|---|---|---|
| 2013/0120572 A1 | 5/2013 | Kwon |
| 2013/0141250 A1 | 6/2013 | Mathieu et al. |
| 2023/0043052 A1 | 2/2023 | Orlinskiy |

FOREIGN PATENT DOCUMENTS

| | | |
|---|---|---|
| DE | 10 2012 221 762 B4 | 12/2020 |
| DE | 10 2019 135 410 A1 | 6/2021 |
| DE | 10 2020 108 009 A1 | 9/2021 |

\* cited by examiner

METHOD FOR PROJECTING AT LEAST ONE IMAGE OR VIDEO INSIDE OR OUTSIDE A VEHICLE

CROSS REFERENCE TO RELATED APPLICATION

This application claims priority under 35 U.S.C. § 119 from German Patent Application No. DE 10 2023 122 311.9, filed Aug. 21, 2023, the entire disclosure of which is herein expressly incorporated by reference.

BACKGROUND AND SUMMARY

The disclosure relates to a method for projecting at least one image or video inside or outside a vehicle, in particular an automobile.

DE102012221762B4 discloses a vehicle having a light projector, wherein the light projector—a head-up light projector—projects light onto the windshield.

DE102012212178B4 discloses a vehicle having a light projector, which projects light onto a projection surface outside the vehicle, in particular behind the vehicle, during parking if the ambient light has an excessively low intensity.

It is an object of the present invention to provide a method and a system for projecting images and videos which enable a reliable and permanent projection.

This object is achieved by the subjects of the independent claims. Advantageous configurations of the invention are specified in the dependent claims.

The invention relates to a method for projecting at least one image or video inside or outside a vehicle, in particular an automobile, comprising the following steps:
  providing data of the image or video in a data memory;
  reading out the data of the image or video by way of a microcontroller of the vehicle and forwarding an image signal to a light projector, which displays the image or video as long as a control unit of the vehicle having a higher computing power than the microcontroller is not started up, wherein the microcontroller is suitable for processing the data of the image or video in order to represent them by means of the light projector; and
  switching over from the microcontroller as data source for the light projector to the control unit as data source for the light projector after a defined time period as soon as the control unit has been started up.

The vehicle preferably has a passenger compartment and advantageously has at least a first row of seats and a second row of seats, optionally also further rows of seats. The term vehicle encompasses motor vehicles such as automobiles, trucks, buses, RVs, motorcycles, etc. used to transport people, goods, etc. The term in particular encompasses passenger transport motor vehicles. Supplementarily or alternatively, the hybrid or electric vehicle in accordance with embodiments may be a battery electric vehicle (BEV) or a plug-in hybrid vehicle (PHEV). However, other forms of drive may also be used, for example in the form of a diesel- or gasoline-powered vehicle. Instead of a vehicle on roads, the vehicle may also be present on rails, in the form of a rail vehicle.

The data of the image or video may be stored in an appropriate codec or format in an arbitrary data memory, such as a flash data memory.

The term microcontroller (also called μcontroller, μC, MCU or single-chip microcomputer) denotes semiconductor chips which contain a processor and at the same time peripheral functions as well. In many cases, even the main memory and program memory are situated partially or completely on the same chip. A microcontroller is a single-chip computer system. The term System-on-a-Chip (SoC) is also used for some microcontrollers. Modern microcontrollers often also include complex peripheral functions such as e.g. CAN (Controller Area Network), LIN (Local Interconnect Network), USB (Universal Serial Bus), I$^2$C (Inter-Integrated Circuit), SPI (Serial Peripheral Interface), serial or Ethernet interfaces, PDM outputs, LCD controllers and drivers, and analog-to-digital converters. Some microcontrollers also have programmable digital and/or analog or hybrid function blocks.

The microcontroller is suitable for processing the data of the image or video and forwarding them in the appropriate format or codec, such as MPEG-1, MPEG-2, MPEG-4, AVI, flash or 3GP, to the light projector and enabling them to be represented.

The light projector is an arbitrary light projector which is an optical unit used to project a two-dimensional original elsewhere in a magnified fashion as an image projection on an image surface or projection surface by way of suitable guidance of the light beams (mirrors, lenses). The original is transparent (slides, photographic negatives) as a transmitted-light image, or is moving (video projection, film projector). The light projector may also be a head-up projector, which is a display system in which the user can maintain their viewing direction and thus their head posture because the information is projected into their field of view, for example onto the windshield of the vehicle. The user, in their field of view, can then both observe the road and read the information inserted by means of the head-up projector, such as specific vehicle data, speed, torque, etc.

The control unit of the vehicle may be a conventional control unit, which may be a computer system and runs using the Linux operating system, for example. The applications of the vehicle such as the navigation system, the multimedia system or other digital displays inside the vehicle then run on this control unit. The control unit of the vehicle is generally started up after the vehicle has been started. The time period for start-up may be 5-15 seconds depending on the control unit used. The control unit of the vehicle has a significantly higher computing power than the microcontroller, such that even complex computation operations for decoding the video data, video rendering and video streaming are made possible by means of the control unit.

Upon the switching over from the microcontroller as data source to the control unit as data source, the data connection of the light projector for input data is disconnected from the microcontroller and set up to the control unit by means of a switchover device, in the form of an electronic circuit, such that after the switching over, image data or video data can be represented by the control unit by means of the light change.

One advantage of this method is that during the starting up of the control unit, the microcontroller serves as data source for an image or a video that is represented by means of the light projector, since the microcontroller is available immediately after the switching on or starting of the vehicle. After the starting up of the control unit, there is a switchover from the microcontroller as data source to the control unit as data source, such that the applications operated on the control unit, such as a navigation system application or a video streaming application, can be represented by means of the light projector.

A further advantage of the method is that by virtue of the image or video being displayed, the fact that the vehicle, in particular the display device, has been switched on and is active is already indicated to the user during the starting up.

Advantageously, the switching over from the microcontroller to the control unit can take place after a time period of at least 5 seconds.

The duration of the starting up may be between 5 and 15 seconds depending on the control unit used.

Advantageously, video streaming and video rendering cannot be possible by means of the microcontroller, wherein video streaming and video rendering can be possible by means of the control unit, wherein after the switching over from the microcontroller to the control unit, video data can be forwarded to the light projector and displayed.

As a result, after the switching over from the microcontroller as data source to the control unit as data source, video rendering and video streaming are made possible, such that corresponding applications can be displayed by means of the light projector. In comparison therewith, by means of the microcontroller, only the stored file of an image or of a video is displayed by means of the light projector. The stored image or the stored video may be, for example, a logo of the vehicle or an advertising video.

Advantageously, the image or video can be projected onto a projection surface next to the vehicle or inside the vehicle on a windshield and/or a side window by means of the light projector.

The light projector can be integrated into one of the side doors of the vehicle, for example, such that during the opening of the vehicle, an image is projected onto the ground laterally next to the vehicle by means of the light projector. The light projector can also be integrated in the interior of the vehicle and project the image or video onto a projection surface on the windshield and/or on the side window. As a result, the image or video is already displayed to the user outside the vehicle or inside the vehicle before the starting up of the control unit.

Advantageously, the control unit can forward video data to a video interface, which converts the video data into an appropriate video format, wherein the video data in the appropriate video format can be forwarded to the light projector and can be displayed.

As a result, the video data provided by the control unit are converted into an appropriate video format or video codec for the light projector in order to be able to project the video data.

The invention also encompasses a system of a vehicle, in particular of an automobile, for carrying out the above-described method, comprising:
  a data memory configured to provide data of an image or of a video, a microcontroller configured to read out and process data of the image or video, a light projector suitable for displaying the data of the image or video, a control unit having a higher computing power than the microcontroller, configured to enable video streaming and video rendering for video data, a switchover device configured to switch over from the microcontroller as data source to the control unit as data source after a defined time period as soon as the control unit has been started up.

The inventive system for carrying out the method can be integrated as an electronic circuit into the vehicle.

One advantage of the system is that during the starting up of the control unit, the microcontroller serves as data source and an image or a video is displayed to the user. After the starting up of the control unit, there is a switchover to the control unit as data source by means of the switchover device, such that even complex applications such as, for example, a navigation system application or a video streaming application can run on the control unit and can display corresponding information to the user on a graphical interface.

A further advantage of the system is that by virtue of the image or video being displayed, the fact that the vehicle, in particular the display device, has been switched on and is active is already indicated to the user during the starting up.

The invention also encompasses a computer program product, comprising instructions which, when the method is executed by a computer, cause the computer to execute one of the embodiments of the methods explained above.

The invention also encompasses a computer-readable medium on which the computer program product is stored.

Other objects, advantages and novel features of the present invention will become apparent from the following detailed description of one or more preferred embodiments when considered in conjunction with the accompanying drawings.

DETAILED DESCRIPTION OF THE DRAWINGS

Hereinafter, unless indicated otherwise, the same reference signs are used for identical and functionally identical elements.

Figure 1:
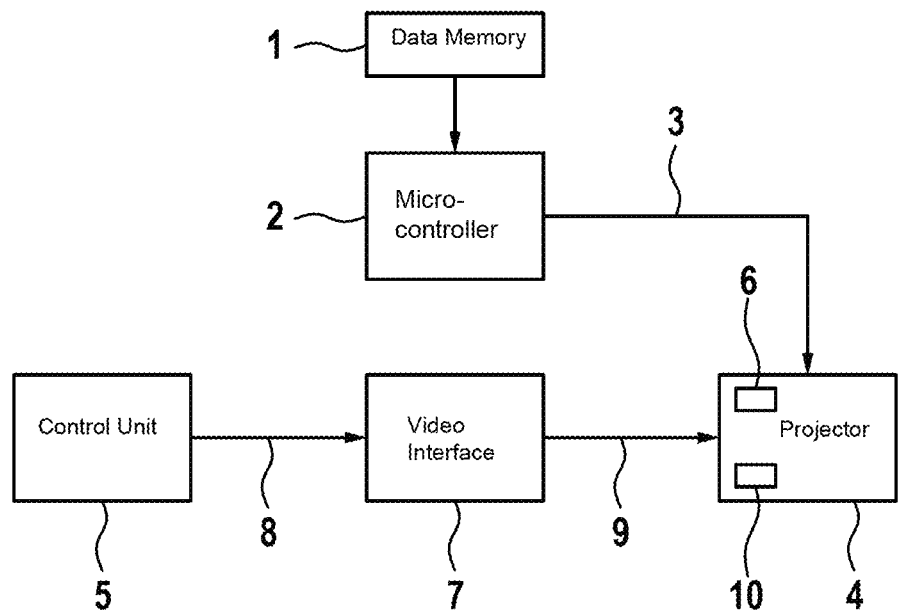
FIG. 1 shows a diagram for elucidating the projecting method.

FIG. 1 shows a diagram for elucidating the method for projecting at least one image or video inside or outside a vehicle. A first step involves providing the data of the image or video in a data memory 1, preferably a flash data memory. In a second step, the data of the image or video are read out by means of a microcontroller 2 of the vehicle and the image signal, as is indicated by the arrow 3, is forwarded to a light projector 4 in order to be represented by means of the light projector 4 for as long as a control unit 5, preferably a computer system having the Linux operating system or some other operating system, is being started up.

As soon as the control unit 5 has been started up, by means of a switchover device 6, which may preferably be integrated in the light projector 4, there is a switchover from the microcontroller 2 as the data source for the light projector 4 to the control unit 5 as the data source for the light projector 4, preferably after a defined time period of at least 5 seconds.

The control unit 5 passes video data to a video interface 7, as is indicated by the arrow 8, wherein the video data are converted into a video format appropriate for the light projector 4, wherein the converted video data in the appropriate video format are forwarded to the light projector 4, as is indicated by the arrow 9, in order to be displayed.

If the light projector 4 is a head-up display, the light projector 4 can also comprise a control device 10, which controls the head-up display accordingly for example for the display or projection onto the windshield of the vehicle, depending on the image data or video data. The control device 10 may be for example a DLPC chipset (automotive digital micromirror device controller) for controlling a head-up display.

In this case, the control unit 5 has a higher computing power than the microcontroller 2, such that complex applications such as a video streaming application or a navigation application can run thereon.

Figure 2:
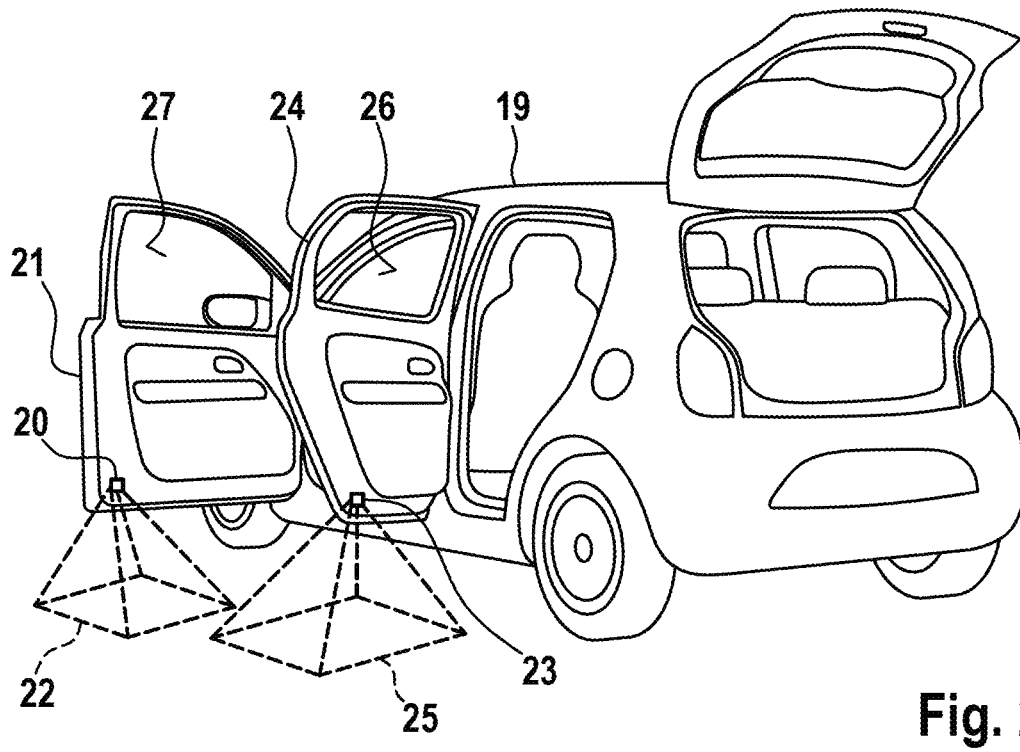
FIG. 2 is a schematic illustration of a system for carrying out the method from FIG. 1.

FIG. 2 shows a schematic diagram of a vehicle 19 having the system for carrying out the method from FIG. 1, wherein the image or the video is projected onto a first projection surface 22 on the ground next to the vehicle 19 by means of a first light projector 20 in a front side door 21 or onto a second projection surface 25 by means of a second light projector 23 in a rear side door 24, as is indicated by the dashed lines. The light projector 4 can also be integrated inside the vehicle, such that the projection surface is positioned on a windshield 26 or a side window 27 of the vehicle 19 and the image or the video is projected onto this projection surface.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for projecting at least one image or video inside or outside a vehicle, the method comprising the steps of:
    providing data of the at least one image or video in a data memory;
    reading-out the data of the at least one image or video via a microcontroller of the vehicle and forwarding an image signal to a light projector, which light projector displays the at least one image or video as long as a control unit of the vehicle having a higher computing power than the microcontroller is not started-up, wherein the microcontroller is configured to process the data of the at least one image or video in order to represent the at least one image or video by way of the light projector; and
    switching over from the microcontroller as a data source for the light projector to the control unit as the data source for the light projector after a defined time period as soon as the control unit has been started-up.

2. The method according to claim 1, wherein the switching over from the microcontroller to the control unit takes place after a time period of at least 5 seconds.

3. The method according to claim 1, wherein
    the video streaming and the video rendering are not possible by the microcontroller, and
    video streaming and video rendering are possible by the control unit, wherein after the switching over from the microcontroller to the control unit, video data are forwarded to the light projector and are displayed.

4. The method according to claim 1, wherein
    the at least one image or video is projected onto a projection surface next to the vehicle or inside the vehicle on a windshield and/or a side window via the light projector.

5. The method according to claim 4, wherein
    the control unit forwards the video data to a video interface, the video interface converting the video data into an appropriate video format, and
    the video data in the appropriate video format are forwarded to the light projector and are displayed.

6. A system of a vehicle, comprising:
    a data memory configured to provide data of an image or a video;
    a microcontroller configured to read-out and process the data of the image or the video;
    a light projector suitable for displaying the data of the image or the video;
    a control unit, having a higher computing power than the microcontroller, configured to enable video streaming and video rendering for the video;
    a switchover device configured to switch over from the microcontroller as a data source to the control unit as the data source after a defined time period as soon as the control unit has been started-up.

7. The system according to claim 6, wherein
    the switchover device is configured to switch over from the microcontroller to the control unit after a time period of 5-10 seconds.

8. The system according to claim 6, wherein
    the light projector has a projection surface on a ground next to the vehicle, inside the vehicle on a windshield, and/or inside the vehicle on a side window, and
    the data of the image or the video is projected onto the projection surface via the light projector.

9. The system according to claim 6, wherein
    the control unit forwards the data of the video to a video interface, the video interface being suitable for converting the data of the video into an appropriate video format in order to forward the data of the video in the appropriate video format to the light projector for display.

10. A computer product comprising a non-transitory computer-readable medium having stored thereon program code which, when executed by one or more processors, causes the acts of:
    reading-out data of an image or video stored in a data memory via a microcontroller of the vehicle and forwarding an image signal to a light projector, which light projector displays the data of the image or the video as long as a control unit of the vehicle having a higher computing power than the microcontroller is not started-up, wherein the microcontroller is configured to process the data of the image or the video in order to represent the data of the image or the video by way of the light projector; and
    switching over from the microcontroller as a data source for the light projector to the control unit as the data source for the light projector after a defined time period as soon as the control unit has been started-up.

* * * * *